US008360270B1

(12) United States Patent
McClosky et al.

(10) Patent No.: US 8,360,270 B1
(45) Date of Patent: Jan. 29, 2013

(54) METHOD FOR FEEDING SMALL ITEMS

(76) Inventors: Robert B. McClosky, Nanuet, NY (US); John Calabrese, Ringwood, NJ (US); Allen M. Bartlo, Woodcliff Lake, NJ (US)

( * ) Notice: Subject to any disclaimer, the term of this patent is extended or adjusted under 35 U.S.C. 154(b) by 937 days.

(21) Appl. No.: 12/315,123

(22) Filed: Nov. 29, 2008

(51) Int. Cl.
*G07F 11/00* (2006.01)
*B65G 47/24* (2006.01)

(52) U.S. Cl. .............. 221/2; 221/110; 221/10; 221/200; 221/277; 221/202; 221/157; 221/160; 221/12; 177/25; 177/18; 177/116; 177/119; 189/33; 189/398; 189/380; 53/510

(58) Field of Classification Search .................. 221/110, 221/7, 10, 200, 277, 202, 2, 157, 160, 12; 177/25.18, 116, 119; 53/510; 198/33, 398, 198/380
See application file for complete search history.

(56) References Cited

U.S. PATENT DOCUMENTS

| | | | | |
|---|---|---|---|---|
| 3,746,211 | A * | 7/1973 | Burgess, Jr. | 221/7 |
| 3,747,738 | A * | 7/1973 | Greck | 406/31 |
| 5,065,852 | A * | 11/1991 | Marti | 198/392 |
| 5,419,442 | A * | 5/1995 | Wright, Jr. | 209/682 |
| 5,804,772 | A * | 9/1998 | Wooldridge et al. | 177/116 |
| 7,128,203 | B2 * | 10/2006 | Baranowski | 198/752.1 |
| 7,258,222 | B2 * | 8/2007 | Marti et al. | 198/393 |
| 7,571,023 | B2 * | 8/2009 | Mitchell et al. | 700/236 |
| 2009/0114665 | A1 * | 5/2009 | Ogawa et al. | 221/2 |
| 2010/0108404 | A1 * | 5/2010 | Kieselhorst | 177/25.18 |

* cited by examiner

*Primary Examiner* — Gene O. Crawford
*Assistant Examiner* — Rakesh Kumar
(74) *Attorney, Agent, or Firm* — Michael R. Philips

(57) ABSTRACT

A method is provided for feeding small items, for example pills, that does not require tooling changes or position adjustment regardless of the size or shape of the pills. A first hopper supplies small items to a second hopper that separates the small items. The method incorporates sensors to detect the presence, size and travel time of the pills in the separating bowl hopper. The method uses the sensed values for setting vibration amplitude and the duration of an air flow to discharge pills from the apparatus.

5 Claims, 4 Drawing Sheets

A) Load a quantity of items in supply bowl hopper

B) Turn power on; supply and separating bowl hoppers vibrate

C) Items travel around supply hopper to discharge chute and transfer to separating bowl hopper D) Items travel around separating bowl hopper E) A first sensor detects items passing F) A second sensor detects the arrival of each item and time for each item to pass G) The second sensor sends a signal to a microprocessor with item passing time H) Repeat steps F and G until 10 items have been measured I) The microprocessor averages time readings, discards anomalous readings and re-averages the time readings remaining in the normal range to set a duration of a blow off air blast J) The first and second sensors send signals to the microprocessor re item travel time between sensors K) The microprocessor calculates the item travel time and adjusts the vibration amplitude of the separation bowl hopper to optimize travel time L) When the first sensor and a third sensor detect a first item, the microprocessor deactivates the vibration of the supply bowl hopper M) When a calculated time period has elapsed, the microprocessor re-starts the vibration of the supply hopper N) Following the determination of the times for 10 items to pass the second sensor, when the second sensor detects the leading edge of an item, the second sensor sends a signal to the microprocessor O) The microprocessor opens a valve to release a flow of air for a selected duration to discharge the item from the separating bowl hopper through an exit chute

Fig. 6

METHOD FOR FEEDING SMALL ITEMS

FIELD OF THE INVENTION

The present invention relates to the field of packaging equipment, and more particularly to equipment to feed small items such as pills for packing in small quantity containers.

BACKGROUND OF THE INVENTION

Pills are made in a broad variety of sizes and shapes for purpose of identification. The term "pills" is used herein to incorporate tablets, capsules, caplets and gel caps. The size variety of pills also accommodates different drug dosage requirements. While this system is clearly functional for its intended purpose, the variety in size and shape necessitates conventional equipment for packaging pills to be modified in some way to accurately handle, count and package different pills. The modification typically involves either replacing certain parts in a packing machine or adjusting the spacing of parts to be able to linearly feed, separate, count and package the required pills.

When a pharmaceutical manufacturer makes pills for commercial distribution, the batch production quantity is normally fairly large and the machine adjustments described are considered to be absorbed by a long production cycle. However, when a secondary packager, also known as a contract packager, or a pharmacy or hospital, needs to package pills, the requirements are often different. One such scenario may be packaging pills in a unit pack for individual doses. In these small quantity packaging situations and where the size or shape pill being packaged changes relatively frequently, changing machine parts or adjusting machine part spacing is relatively onerous and time consuming. Thus a need exists for pill packing equipment, particularly equipment for feeding pills to a packaging machine that can handle many different sizes and shapes of pill without a need for machine part changing or adjusting.

SUMMARY OF THE INVENTION

The invention disclosed below provides a method for feeding small items, e.g. pills, in a variety of sizes and shapes without the need for changing parts or making adjustments in the feeding apparatus. The feeding method employs two vibratory bowl hoppers in tandem. The upstream bowl hopper is operated intermittently in response to signals from a microprocessor. The microprocessor receives signals from a number of sensors that determine the size and quantity of items in the downstream bowl hopper. The downstream bowl hopper is contoured to feed the items up an incline to a point and then to introduce a downward decline for acceleration and separation of pills. An air flow is triggered by a sensor for discharging individual items from the downstream bowl hopper to a further process station, e.g. a packaging machine. Initial operation includes a learning phase where the microprocessor accumulates sensor data for a determination of the size and traveling speed of the pills being packed.

BRIEF DESCRIPTION OF THE DRAWINGS

The present invention is best understood in conjunction with the accompanying drawing figures in which like elements are identified by similar reference numerals and wherein:

FIG. 6 is a chart of process steps carried out by the method of the present invention.

DETAILED DESCRIPTION OF THE PREFERRED EMBODIMENT

Figure 1:
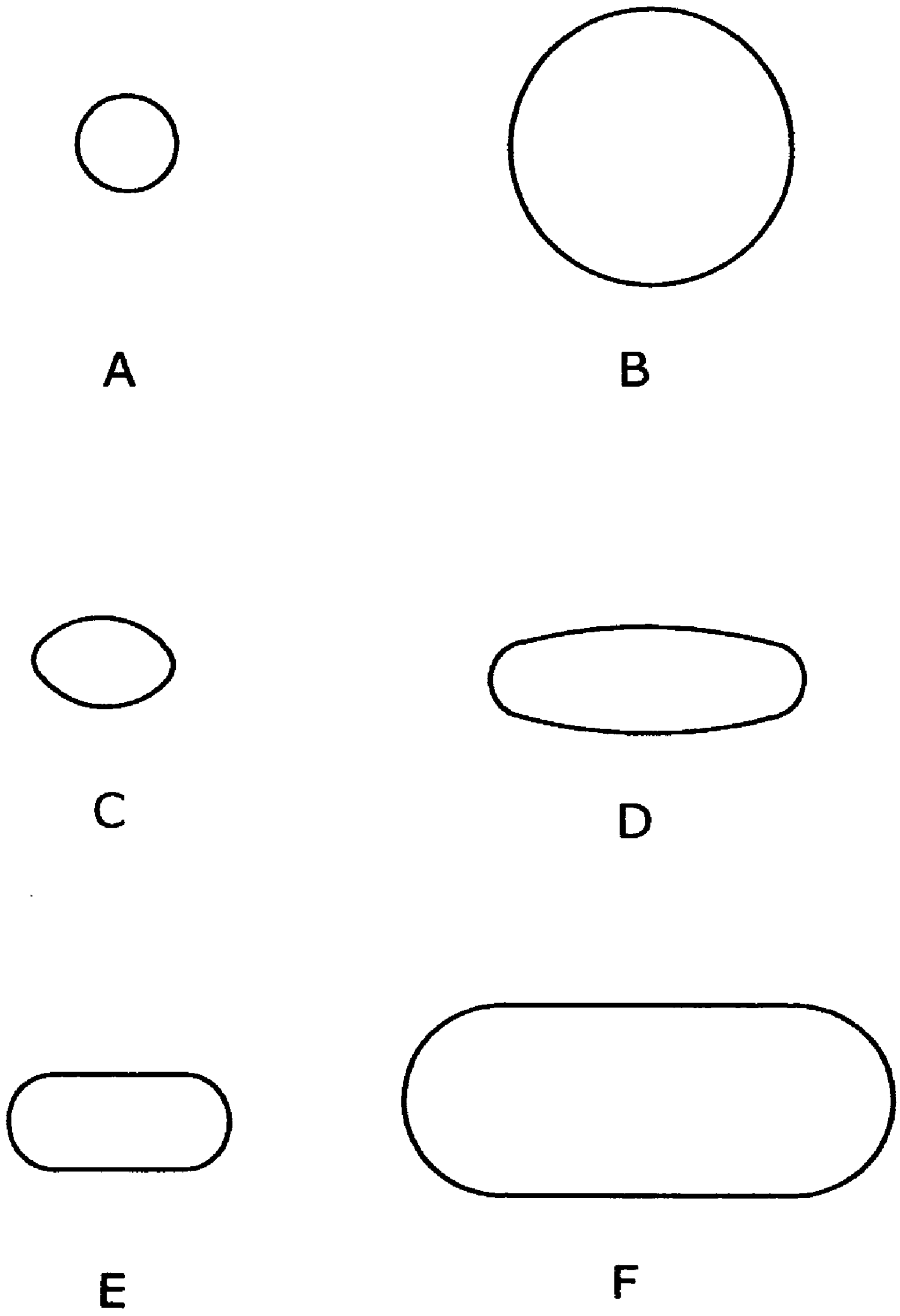
FIG. 1 is a diagrammatic array representative of a portion of the variety of sizes and shapes of currently manufactured pills.

Referring to FIG. 1, a number of pills A, B, C, D, E and F are shown as representative of the variety of pill sizes and shapes that may be fed by the apparatus of the present invention without requiring any part replacement or part position adjustment. As is shown, pills B, D and F are depicted as larger versions of pills A, C and E, being of similar shapes. Other sizes and shapes as are generally known are able to be fed by the invention feeding apparatus. In addition to the variety of sizes and shapes, pills may have different exterior surfaces, thereby resulting in different coefficients of friction and movement speed. Whereas the preferred embodiment of the present invention pertains to feeding pills, it is to be understood that the apparatus and method are adapted to the feeding of different types of small items as well.

Figure 2:
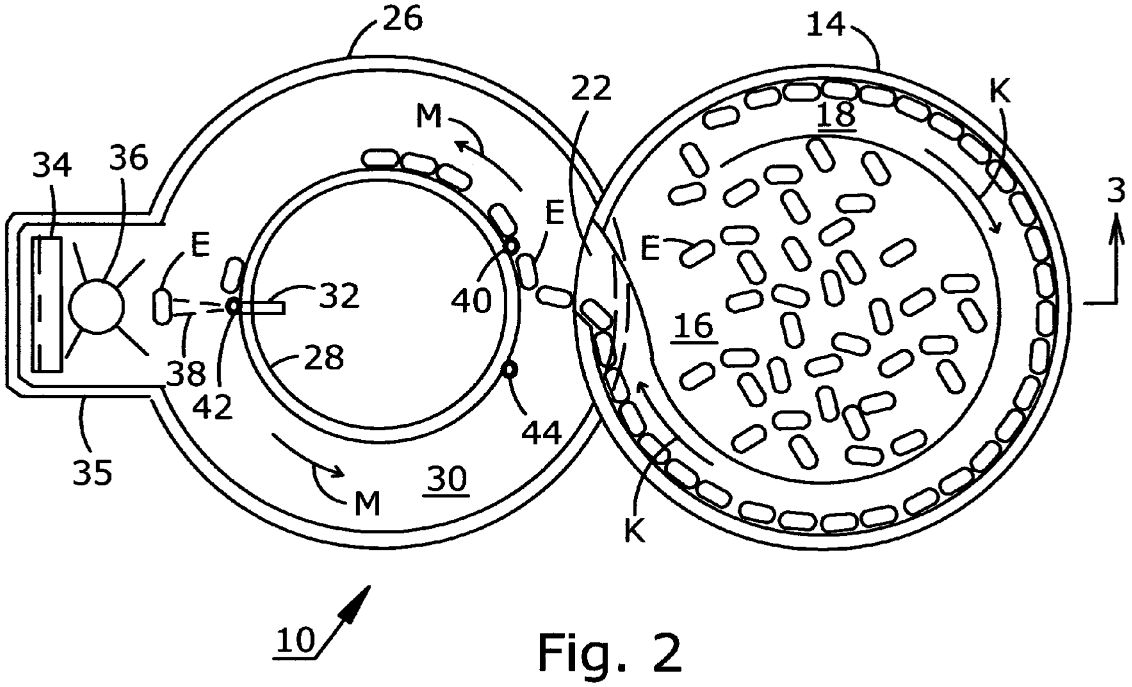
FIG. 2 is a top plan view of the small part feeding apparatus of the present invention.

Referring now to FIG. 2, the small item feeding apparatus 10 of the invention is shown in top plan view, comprising a supply bowl hopper 14 and a separating bowl hopper 26. Supply bowl hopper 14 is mounted at a higher level to overlap a portion of separating bowl hopper 26 (see FIG. 3). An additional supply hopper may be added in the system in a situation where the capacity of supply bowl hopper 14 is insufficient to feed an adequate number of pills for production needs. A number of exemplary pills E are shown in supply bowl hopper 14 from which they are fed to separating bowl hopper 26. Whereas supply bowl hopper 14 is positioned to discharge pills E into separating bowl hopper 26 at approximately the 3:00 position of hopper 26, alternate relative orientations between the two hoppers may be used to vary the length of the travel path for pills E. According to the design principles of the invention, pills E of substantially any size or shape will be conveyed to a packaging machine with no need to adjust or exchange components in the apparatus. As described below, the invention apparatus has the ability to spontaneously calibrate operating parameters to accommodate the specific pill or other small item. As illustrated, pills E travel around the peripheral edge of supply bowl hopper 14 in the clockwise direction as indicated by arrow K and around the inner rim of separating bowl hopper 26 in the counterclockwise direction as indicated by arrow M.

Referring further to FIG. 2, supply bowl hopper 14 is a substantially standard vibratory bowl hopper having a floor portion 16 and a ramp 18, ramp 18 gradually increasing in height above floor 16 in the clockwise direction to reach a maximum height immediately prior to a discharge chute 22. Whereas the supply hopper is described as a standard vibratory bowl hopper, it is understood that other types of hopper or supply conveyor capable of feeding pills and being intermittently actuated will function in the invention disclosed. Supply bowl hopper 14 is mounted to position discharge chute 22 overlapping the periphery of separating bowl hopper 26. Separating bowl hopper 26 is a vibratory bowl hopper that is configured in a unique shape to cause pills E to travel around the inner rim 28 thereof. A first sensor 40, a second sensor 42 and a third sensor 44 are mounted below hopper 26 radially adjacent to inner rim 28. As illustrated, first sensor 40 is positioned approximately at the 2:00 position under separating bowl hopper 26, using standard clock-face numeral positioning terminology, second sensor 42 at the 9:00 position, and third sensor 44 at the 4:00 position. If the relative positioning of supply bowl hopper 14 and separating bowl hopper 26 is changed as described above, the relative position of sensors 40, 42 and 44 are also subject to change. The sequential numbering of sensors 40, 42 and 44 follow the counterclockwise direction of travel indicated by arrow M, with first sensor 40 designated as the first sensor in the path of pills E entering separating bowl hopper 26 from supply bowl hopper 14. Sensors 40, 42 and 44 in the preferred embodiment, are retro-reflective photoelectric sensors to be used in conjunction with an opposed mirror as described below. Separating bowl hopper 26 is made from a transparent material to allow sensors 40, 42 and 44 to view through hopper 26 and sense pills passing thereby. Separating bowl hopper 26 is formed with a substantially conical throat 35 terminating at an exit 36, a downwardly open hole. A deflector 34 is mounted adjacent to exit 36 and distal from the center of hopper 26. The path of pills E adjacent to inner rim 28 gradually rises from approximately the 8:00 position counterclockwise to approximately the 11:00 position. From 11:00, the path declines to arrive at the original height at 8:00. Whereas the distance counterclockwise from 8:00 to 11:00 is significantly greater than the distance from 11:00 to 8:00, the decline is steeper than the rise. As each pill E passes a crest at approximately 11:00, pill E accelerates down the decline from 11:00 to 9:00, arriving at second sensor 42, and a pair of blow off tubes 32 (only one visible in this view) that are positioned approximately at the 9:00 position. The contour continues to decline to the 8:00 position to begin an upward incline. As the leading edge of a pill E descends the decline from 11:00, arriving at second sensor 42, a microprocessor (not shown) receives an input from second sensor 42. The microprocessor signals to cause the actuation of a pressurized air supply, resulting in an air flow 38 from tubes 32 to propel pill E into throat 35 and through exit 36 to a packaging machine or the like (not shown). Depending on the mass of pill E, air flow 38 may propel pill E to contact deflector 34 and then downwardly to exit 36. Depending on the quantity of pills E in separating bowl hopper 26 and the time requirements of the process, numbers of pills E are not discharged to exit 36. Pills E not discharged continue to travel around separating bowl hopper 26 to be available at discharge throat 35 in a later sequence.

Figure 3:
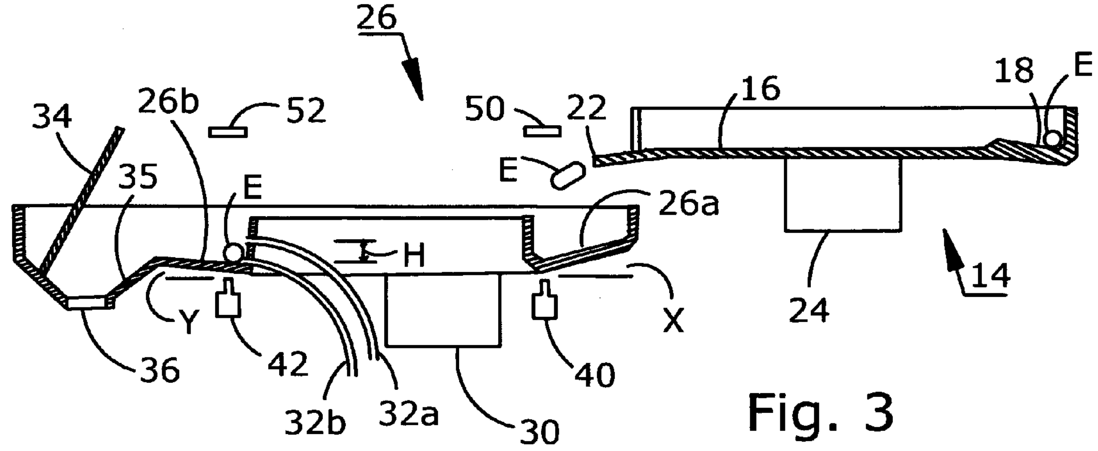
FIG. 3 is a cross sectional view of the apparatus of FIG. 2 taken in the direction of line 3.

Referring now to FIG. 3, a cross sectional view is shown as taken in the direction indicated by line 3 of FIG. 2. Supply bowl hopper 14 has a substantially flat central floor 16 and a ramp 18 that gradually rises. A vibratory device 24 is affixed to supply bowl hopper 14 to cause vibratory motion thereof. The outer sections of supply bowl hopper 14 are angled downward to encourage pills E to travel around the periphery thereof, as is known. A first exemplary pill E is shown resting toward the outer perimeter of ramp 18, a second exemplary pill E is shown being transferred from supply bowl hopper 14 to separating bowl hopper 26, and a third exemplary pill E is shown in front of blow off tubes 32*a* and 32*b*.

Referring further to FIG. 3, separating bowl hopper 26 is formed in a unique configuration. A vibratory device 30 is affixed to separating bowl hopper 26 to cause vibratory motion thereof. Travel path segment 26*a*, extending generally from 8:00 to 11:00 in the counterclockwise direction (see FIG. 2) is inclined radially upward toward the periphery of separating bowl hopper 26 at a preferred angle X of approximately 15°. Travel path segment 26*b*, extending generally from 11:00 to 8:00 in the counterclockwise direction is inclined radially upward toward the periphery of separating bowl hopper 26 at a preferred angle Y of approximately 5°. A gradual transition is provided of the incline angle from segment 26*a* to segment 26*b* and vice versa. Inclination of segments 26*a* and 26*b* upwardly toward the periphery of separating bowl hopper 26 assures that pills E will travel around hopper 26 in a path adjacent to the inner rim thereof, as shown in FIG. 2. Reducing the angle of inclination from approximately 15° to approximately 5° optimizes the discharge of pills E when impinged by an air flow from blow off tubes 32*a* and 32*b*. The preferred angles noted are described as being examples, not limitations, on the available angles for inclination of segments 26*a* and 26*b*. First photoelectric emitter/sensor 40 is positioned below the base of travel path segment 26*a*, and second photoelectric emitter/sensor 42 is positioned below travel path segment 26*b*. A mirror 50, or similar device, is positioned above travel path segment 26*a* in line with first emitter/sensor 40, and a second mirror 52 is positioned above travel path segment 26*b* in line with second emitter/sensor 42. Alternative types of sensors than photoelectric sensors are believed to be within the scope of the present invention. Throat 35 is oriented at a downward angle from travel path segment 26*b* to terminate at exit 36. In use, exit 36 is positioned above an entry of a packaging machine or other device. Deflector 34 is mounted in a manner to permit adjustment of the angle in order to deflect a pill E, being discharged by an air flow from blow off tubes 32*a* and 32*b*, into throat 35 and out through exit 36. As seen in this view, the invention provides a plurality of blow off tubes 32*a* and 32*b*, preferably 2 blow off tubes, in a position opposed to exit 36. Lower blow off tube 32*b* is positioned close to the base of travel segment 26*b* and upper blow off tube 32*a* is positioned an increment H above lower blow off tube 32*b*.

Figure 4:
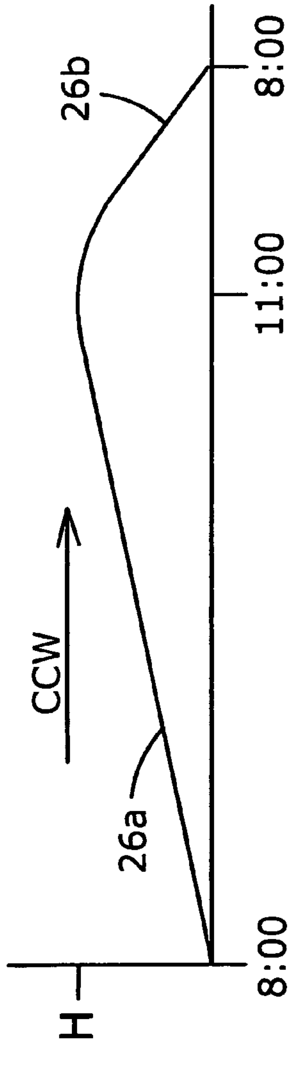
FIG. 4 is an extended graphical representation of a ramp of the small item feeding apparatus of FIG. 2.

Referring now to FIG. 4, an extended graphical representation is shown of a ramp of separating bowl hopper 26 of FIG. 2. As described above in relation to FIG. 2, pills E travel in a counterclockwise direction around separating bowl hopper 26. FIG. 4 portrays the path length from the 8:00 position to the 11:00 and back to the 8:00 position. Travel path 26*a*-26*b* inclines upward in the counterclockwise direction from 8:00 to a maximum height H at 11:00 to then decline downward to 8:00. The downward slope of the segment from 11:00 to 8:00 is angularly greater than the upward slope of the segment from 8:00 to 11:00 to cause the pills being conveyed to accelerate on the downward slope and become separated from the pills that follow. This separation process enables a discreet sensing of each pill as it approaches the blow off tubes to accurately activate the air flow. A height differential H between the highest point at 11:00 and the lowest point at 8:00 that has been found to be effective for conveying and transporting a variety of pills is approximately 1.1 cm (0.435 inches). Other height differentials are understood to be within the scope of the invention, being dependent on several parameters, including the mass, surface friction and geometry of the pill, the surface friction and vibration characteristics of the bowl hopper, etc.

Figure 5:
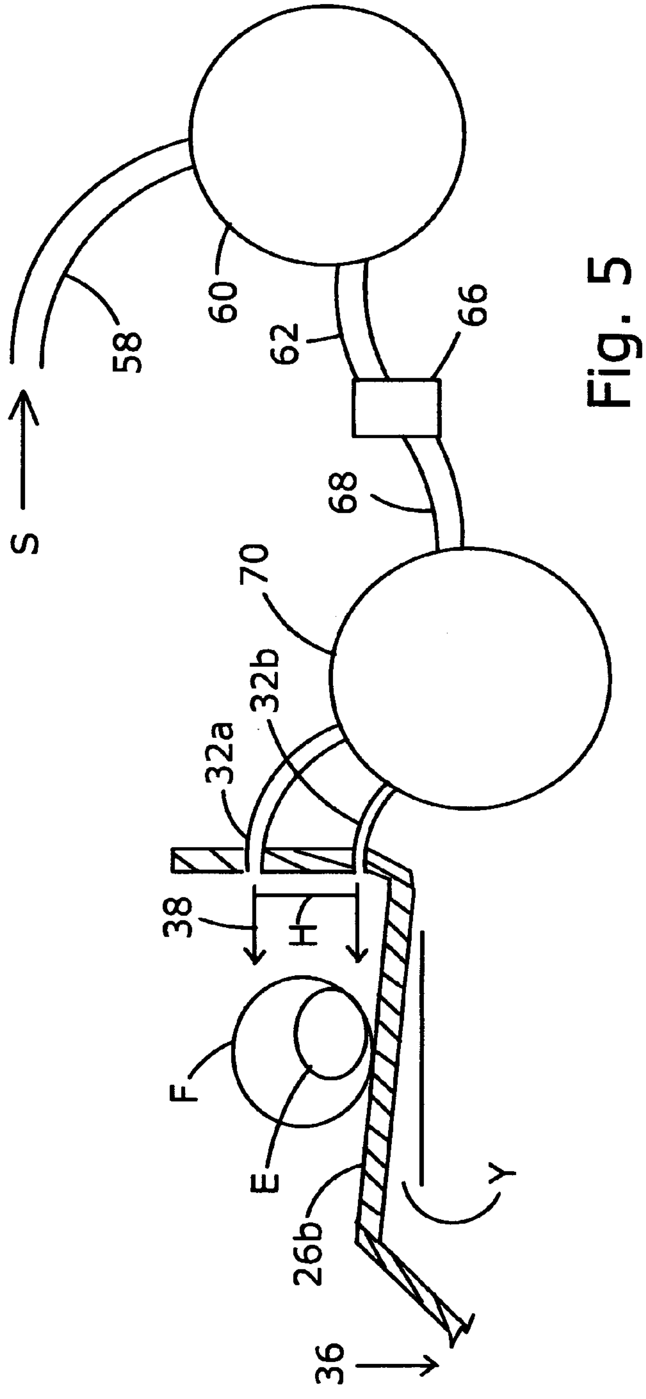
FIG. 5 is a schematic illustration of the pneumatic circuit of the apparatus of FIG. 2.

Referring now to FIG. 5, a schematic illustration is shown of the pneumatic circuit of the apparatus disclosed herein. For purposes of description, a representation of a smaller pill E and a larger pill F are superimposed on the surface of travel path segment 26*b*. Pills E and F are shown after the air flow from blow off tubes 32*a* and 32*b* has been actuated to move pill E or pill F toward exit 36. Travel path segment 26*b* is oriented at an angle Y that inclines radially upward from the ends of blow off tubes 32*a* and 32*b* at the low point of travel path segment 26*b*, angle Y being configured to cause pill E or pill F to reside toward the right (as illustrated). Angle Y is preferably approximately 5° above horizontal. A source S of pressurized air is connected to a hose 58 that is connected on a distal end to an inlet of an accumulator 60. Accumulator 60 is a reservoir of any arbitrary shape for receiving pressurized air over a time increment. An outlet of accumulator 60 is connected to a hose 62 with the other end of hose 62 connected to an inlet of a valve 66. An outlet of valve 66 is connected to an inlet of a hose 68 that connects to a second accumulator 70. Accumulator 70 may be similar to or different from the size of accumulator 60, while performing basically the same function. Accumulator 70 is connected to blow off tubes 32*a* and 32*b*. When the microprocessor opens valve 66, the pressurized air in accumulator 60 gradually fills second accumulator 70. As accumulator 70 begins to fill, and pressure begins to increase, a low velocity air flow begins to discharge through blow off tubes 32*a* and 32*b*. If smaller pill E is in front of blow off tubes 32*a* and 32*b*, the initial low velocity flow mainly from lower blow off tube 32*b* will propel pill E toward exit 36. If larger pill F is in front of blow off tubes 32*a* and 32*b*, the mass of pill F will resist movement until accumulator 70 attains a higher pressure and the air flow through blow off tubes 32*a* and 32*b* is at a higher velocity, the air flow through upper blow off tube 32*a* and lower blow off tube 32*b* both propelling pill F. In addition, the microprocessor maintains valve 66 open for a time interval proportional to the length of the pill being conveyed. Thus, a shorter pill, e.g. pill E, will receive a shorter time value air blast that is sufficient to discharge pill E to exit 36. Conversely, a longer pill, e.g. pill F, will receive a longer time value air blast needed to discharge pill F to exit 36. Therefore, a number of features of the present invention are provided to control the discharge velocity of pill E, including positioning an upper blow off tube 32*a* at a height greater than lower blow off tube 32*b* to enable the air flow from upper blow off tube 32*a* to impinge only a larger pill F and impart a greater discharge velocity to pill F. In addition, the duration of the blow off air flow is adjusted automatically according to the size pill being discharged. The use of second accumulator 70 causes the blow off air flow to initially move a smaller pill at a relatively low air velocity and pressure, increasing gradually to move a larger pill with a relatively high air velocity and pressure.

In operation, valve 66 is normally closed. Pressurized air from air source S gradually fills accumulator 60 until the pressure within accumulator 60 is equal to the pressure of air source S. According to the preferred embodiment of the invention, the pressure of air source S is set at between 10 psig and 20 psig, most preferably at 15 psig. At this stage, the pressure in second accumulator 70 is substantially equal to atmospheric, or 0 psig. When valve 66 is opened by a signal received from the microprocessor (not shown), the pressurized air from first accumulator 60 flows through hose 62, valve 66 and hose 68 to enter second accumulator 70. The air flowing through hose 68 into accumulator 70 causes the pressure inside accumulator 70 to rise over time, eventually reaching a steady state. This rising pressure results in air beginning to flow through blow off tubes 32*a* and 32*b*. The rate of pressure rise in accumulator 70 and the related discharge flow gradient through blow off tubes 32*a* and 32*b* is a function of the air pressure, tubing diameter and length and the volume of accumulator 70. These parameters are specified to result in an air flow through blow off tubes 32*a* and 32*b* which discharges a smaller pill E early in the discharge flow gradient while a larger pill will be discharged later in the discharge flow gradient after steady state has been achieved. Utilization of the discharge flow gradient allows the pressure at source S to be set at a higher level, necessary to discharge the larger/heavier pills without causing the smaller/lighter pills to be discharged with excess velocity. As noted earlier, travel path segment 26*b* is inclined at angle Y of approximately 5° to hold pill E or F toward the center of separating bowl hopper 26 to be close to blow off tubes 32*a* and 32*b*, optimizing the effectiveness of air flow 38, while not being an excessive incline to impede pill movement.

Referring further to FIG. 5, lower blow off tube 32*b* resides at or incrementally above travel path segment 26*b* to reliably impinge on and discharge a small pill E. Upper blow off tube 32*a* resides at a height H above lower blow off tube 32*b* to impinge a larger pill F. The air flow from lower blow off tube 32*b* will be sufficient to propel smaller pill E to the left (as illustrated), with the air flow from upper blow off tube 32*a* passing over pill E until pill E is higher up the inclined surface of travel path segment 26*b*, at which time pill E is in the air flow from both blow off tubes 32*a* and 32*b*. As will be understood, when pill E is a greater distance from the exit point of the blow off tubes 32*a* and 32*b*, the air flow will be less forceful. The greater mass of larger pill F will resist the initial, low velocity air flow, and only be propelled when the pressure in second accumulator 70 has increased to generate a higher velocity air flow.

Referring now to FIG. 6, a chart is provided of process steps carried out by the method of the present invention. In step A, a quantity of items, e.g. pills, is loaded into the supply bowl hopper. In step B, power is turned on, causing a supply bowl hopper and a separating bowl hopper to vibrate at a pre-set default amplitude. In step C, the items travel clockwise around the periphery of the supply bowl hopper to a discharge point and transfer to the separating bowl hopper. In step D, the items travel counterclockwise around the inner rim portion of the separating bowl hopper. In step E, a first sensor detects items passing. In step F, a second sensor detects the time for each item to pass. In step G, the second sensor sends a signal to a microprocessor relating to item passing time. In step H, step G is repeated until 10 items have been detected. In step I, the microprocessor averages item passing time readings, discards anomalous readings and re-averages the time readings remaining in the normal range to set a duration for the blow off air blast. In step J, the first and second sensors send signals to the microprocessor for determination of the item travel time between sensors. In step K, the microprocessor calculates the time for each item to travel from the first to the second sensor and adjusts the amplitude of vibration of the separation bowl hopper to set pill travel speed. In step L, when the first sensor continues to see pills and a third sensor detects a first pill, the microprocessor deactivates the vibration of the supply bowl hopper. In step M, after a time period derived from the average pill travel time, the microprocessor re-activates the vibration of the supply bowl hopper. In step N, following the determination of the times for 10 pills to pass the second sensor, when the second sensor detects the leading edge of a pill, the second sensor sends a signal to the microprocessor. In step O, the microprocessor opens a valve, releasing an air flow to discharge the pill through an exit chute.

While the description above discloses preferred embodiments of the present invention, it is contemplated that numerous modifications of the invention are possible and are considered to be within the scope of the claims that follow.

What is claimed is:

1. A method for feeding small items by means of a supply bowl hopper configured for encouraging small items being fed toward the periphery thereof and a separating bowl hopper configured for encouraging small items being fed toward the center thereof, the method comprising the steps of:

a. loading a quantity of small items into the supply bowl hopper;
b. causing the supply bowl hopper to vibrate in order to transfer the small items to the separating bowl hopper;
c. causing the separating bowl hopper to vibrate in order to move the small items in the separating bowl hopper in a circular path toward the center thereof;
d. measuring the time for each of a plurality of small items to pass a sensor in the separating bowl hopper;
e. setting a time duration for an air flow on the basis of the time of the small items to pass the sensor;
f. measuring the time for each small item to travel a distance around the separating bowl hopper;
g. setting a vibration amplitude of the separating bowl hopper on the basis of the travel time;
h. sensing a small item approaching a blow off air hose;
i. activating an air flow directed through the blow off air hose for discharging the small item to an exit chute; and
j. stopping the air flow after the air flow time duration has elapsed.

2. The method for feeding small items described in claim 1, wherein the step of activating an air flow further comprises causing pressurized air to flow from a source into an accumulator and from the accumulator to the blow off hose to effect a pressure gradient over time.

3. The method for feeding small items described in claim 1, further comprising the steps of detecting a quantity of small items in the separating bowl hopper and stopping the vibration of the supply bowl hopper.

4. The method for feeding small items described in claim 3, further comprising the steps of determining that the quantity of small items in the separating bowl hopper is less than a selected quantity and activating the vibration of the supply bowl hopper.

5. The method for feeding small items described in claim 1, further comprising the steps of determining that no small items are in the separating bowl hopper, turning off power to the supply bowl hopper and the separating bowl hopper and setting the vibration amplitude and the air flow duration to default values.

* * * * *